United States Patent [19]

Hanaki et al.

[11] Patent Number: 4,746,479
[45] Date of Patent: May 24, 1988

[54] METHOD OF MANUFACTURING A BLOCK-TYPE HEAT EXCHANGE ELEMENT

[75] Inventors: Kenichi Hanaki, Kariya; Kazuhiro Inoguchi, Okazaki, both of Japan

[73] Assignee: Nippon Soken, Inc., Nishio, Japan

[21] Appl. No.: 669,877

[22] Filed: Nov. 9, 1984

[30] Foreign Application Priority Data

Dec. 29, 1983 [JP] Japan ............................. 58-247230

[51] Int. Cl.⁴ ............................................. B29C 47/00
[52] U.S. Cl. ........................................ 264/62; 264/67; 264/150; 29/157.3 R; 65/66; 65/70
[58] Field of Search ............................. 264/67, 62, 150; 29/157.3 R; 65/70, 66

[56] References Cited

U.S. PATENT DOCUMENTS 4,041,592  8/1977  Kelm ..................................... 264/62
4,421,702 12/1983  Oda et al. ............................. 264/62

FOREIGN PATENT DOCUMENTS 50-22365  7/1975  Japan .

Primary Examiner—James Derrington
Attorney, Agent, or Firm—Cushman, Darby & Cushman

[57] ABSTRACT

A monolithic, block-type heat exchange element having a series of fluid channels is manufactured by making use of extrusion molding. Extrudable molding material is extruded to form a continuous molding having opposed first and second surfaces. The extruded molding is provided with a series of discrete first passages and another series of discrete second passages both extending along the direction of extrusion and between the first and second surfaces. The molding is transversely cut into sections. At least parts of the molding section are then cut out along the first and second surfaces until the first passages are opened into the first and second surfaces. The openings of the first passages opened into the third and fourth surfaces extending perpendicular to the direction of extrusion are closed by suitable closure material to form a series of first fluid channels for a first heat exchange medium. The second passages extend throughout the molding section in the direction of extrusion and thus serve to form a series of second fluid channels for a second heat exchange medium.

26 Claims, 14 Drawing Sheets

METHOD OF MANUFACTURING A BLOCK-TYPE HEAT EXCHANGE ELEMENT

BACKGROUND OF THE INVENTION

(1) Field of the Invention

The present invention relates to a method of manufacturing heat exchange elements for exchanging heat between two or more fluid flows and, more particularly, to a method of manufacturing block-type heat exchange elements.

The term heat exchange as used herein is intended to include not only the exchange of sensible heat between two or more fluid flows but also the exchange of latent heat in the form of moisture.

(2) Description of the Prior Art

Known in the prior art are laminated type heat exchange elements wherein flat and corrugated sheets are alternately disposed one upon the other in such a manner as to form two sets of fluid channels intersecting each other (see, for example, Japanese Examined Utility Model Publication No. 50-22365). This type of heat exchange elements are difficult to assemble and expensive to manufacture because the flat and corrugated sheets must be bonded together by a sequence of complicated procedures. Furthermore, the sheet materials must be sufficiently stiff and self-sustaining to facilitate their handling, bonding or welding operations. Thus, there is a limitation on the minimization or reduction that can be made to the wall thickness of the sheet materials, thereby precluding any enlargement of the heat transfer surface per unit volume of the element and, hence, any increase in the heat exchange efficiency.

Also known in the prior art are the block type heat exchange elements comprising monolithic blocks of a single material such as graphite. The graphite block is machined to form two or more series of fluid channels for circulating heat exchange fluids. However, the disadvantages of machining lie in the high production costs entailed and in the unsatisfactory limitations placed on the allowable minimum thickness of the wall located between adjacent channels.

SUMMARY OF THE INVENTION

The primary object of the present invention is to provide a method of manufacturing a block type heat exchange element which can be carried out simply and on a mass production basis and is capable of producing heat exchange elements at a reduced cost.

Another object of the present invention is to provide a method of making a block type heat exchange element having a minimum or extremely thin wall thickness between adjacent fluid passages so as to improve the heat transfer capability or thermal conductivity across the element walls and to enhance the heat exchange efficiency.

Still another object of the present invention is to provide a method of manufacturing a block type heat exchange element having an extended heat transfer surface area per unit volume.

A further object of the present invention is to provide a method of making a block type heat exchange element having a high mechanical strength and durability and an improved design flexibility.

According to the present invention, the block type heat exchange element is made by recourse to extrusion molding. The block type heat exchange element in its completed form comprises a monolithic block of any suitable material having mutually opposed first and second surfaces and mutually opposed third and fourth surfaces intersecting the first and second surfaces. The heat exchange block in its finished form includes a series of discrete first fluid channels extending therethrough between the first and second surfaces and another series of discrete second fluid channels extending therethrough between the third and fourth surfaces, the second fluid channels being independent from the first fluid channels. According to the method of present invention, this block type heat exchange element is manufactured in the following manner. First, a molding material in the extrusion moldable state is prepared. This molding material is then subjected to extrusion molding to form a continuous molding having a predetermined transversal cross-sectional configuration. This continuous molding is characterized by mutually opposing, continuous, first and second surfaces extending parallel to the direction of extrusion and forming the afore-mentioned first and second surfaces in the finished block. The continuous molding is also characterized by a series of discrete first passages extending throughout the molding in a direction parallel to the direction of extrusion and by another series of discrete second passages extending throughout the molding parallel to the direction of extrusion. Each of the first passages has an elongated cross-sectional configuration extending between the first and second continuous surfaces up to a predetermined first depth therefrom. Each of the second passages also has an elongated cross-sectional configuration extending between the first and second continuous surfaces up to a predetermined second depth greater than the first depth. The first and second passages are arranged alternately and are separated from each other by partition walls extending between the first and second continuous surfaces in parallel to the direction of extrusion. The second passages serve to form the afore-mentioned second fluid channels in the completed element. The thus-shaped continuous molding is then allowed to set and is cut transversely along a predetermined length to form a molding section, with the cutting planes forming the afore-mentioned third and fourth surfaces in the completed element. By cutting, the first and second passages will be opened into the third and fourth surfaces. In a subsequent step, the openings of the first passages appearing into the third and fourth surfaces are closed by a suitable closure material. Subsequent to or prior to closing of the openings of the first passages, at least parts of the molding section are cut out transversely along the first and second surfaces at a predetermined third depth intermediate to the first and second depths until the first passages are opened into the first and second surfaces. The resulting first passages closed at the ends located at the third and fourth surfaces and opened at the ends located at the first and second surfaces form the afore-mentioned first fluid channels in the finished heat exchange element.

By making use of extrusion molding, the method according to the invention enables the block type heat exchange elements to be manufactured simply, at a reduced cost, and on a mass production basis. When during the extrusion molding step the first and second passages have been formed with the afore-mentioned depth relationship, a finished heat exchange element can be obtained simply by cutting after setting the continuous molding into sections, by closing the openings of the first passages appearing in the direction of extrusion, and by cutting out the molding section to open the first passages in the transverse direction.

The cutting step, closing step, and cutting out step need not be carried out in the order mentioned and may be performed in another sequence as required.

Another important advantage of the method according to the present invention is that the use of extrusion molding ensures extremely thin partition walls between the first and second fluid channels, the thickness of the partition walls being in some instances as small as about 0.06 mm. This enables an increase of the heat transfer ability across the walls and, in turn, enhances the heat exchange efficiency of the element.

Extrusion molding also makes it possible to considerably reduce the cross-sectional flow area of the fluid channels so that the number of fluid channels per unit volume of the element can be increased, thereby extending the heat transfer surface area per unit volume. This also contributes to an increase in the heat exchange efficiency of the element. According to the method of the invention, the width of the fluid channels may be made as small as 0.6 mm.

The block type heat exchange element may be in the form of a parallelepiped, a hollow cylinder, a segment of a hollow cylinder, a prism of equilateral trapezoid, or various other shapes.

To avoid the formation of corrugations in the partition walls during the extrusion step or immediately thereafter, the ratio of the width of the cross-sectional configuration of the first and second passages with respect to the length thereof may be in the range of from 1 to 15, preferably, from 1 to 8.

The second fluid channels formed by the second passages extend in the direction of extrusion in the finished element. Thus, according to the preferred embodiment of the invention, each individual second passage may be divided during the extrusion step into a plurality of sub-passages by a plurality of separating walls extending parallel to the first and second surfaces in the direction of extrusion. These separating walls advantageously serve to prevent formation of the aforementioned corrugations in the partition walls, to reinforce the strength of the finished article, and to increase the heat transfer surface area.

In contrast, the first passages serve to constitute the first fluid channels, which in the finished element extend transversely with respect to the direction of extrusion. Therefore, it is not possible to divide the individual first passage into a plurality of sub-passages by forming during the extrusion molding step a plurality of separating walls extending in the direction of extrusion. Thus, according to another preferred embodiment of the invention, a plurality of ribs extending in the direction of extrusion along the inner walls of the respective first passages are formed during the extrusion molding step to prevent corrugations in the partition walls and to enlarge the heat transfer surface area. However, the height of these ribs must be so selected that they will not excessively increase the flow resistance across the first fluid channels.

The ribs on the inner walls of the first passages may be positioned in a symmetrical relationship with the separating walls in the second passages with respect to the partition walls. With this arrangement, the formation of corrugations in the partition walls may be more effectively obviated.

The material forming the heat exchange block may be any suitable material as long as it is extrudable and sufficiently self-sustaining that it will support the shape and configuration thereof during extrusion and during subsequent various processings, and if it presents a suitable mechanical strength during the use of the elements. Such materials include ceramics, thermoplastic resins, metals, glass, pulp, and others. When a ceramic forming green is to be used as an extrudable molding material, the extruded molding must be dried in the afore-mentioned setting step followed by sintering to form ceramic blocks.

These and other features of the invention as well as the advantages thereof will become apparent from the following description.

BRIEF DESCRIPTION OF THE DRAWINGS

Throughout the various views, like parts and members are designated by like reference numerals.

DESCRIPTION OF THE PREFERRED EMBODIMENTS

Figure 1:
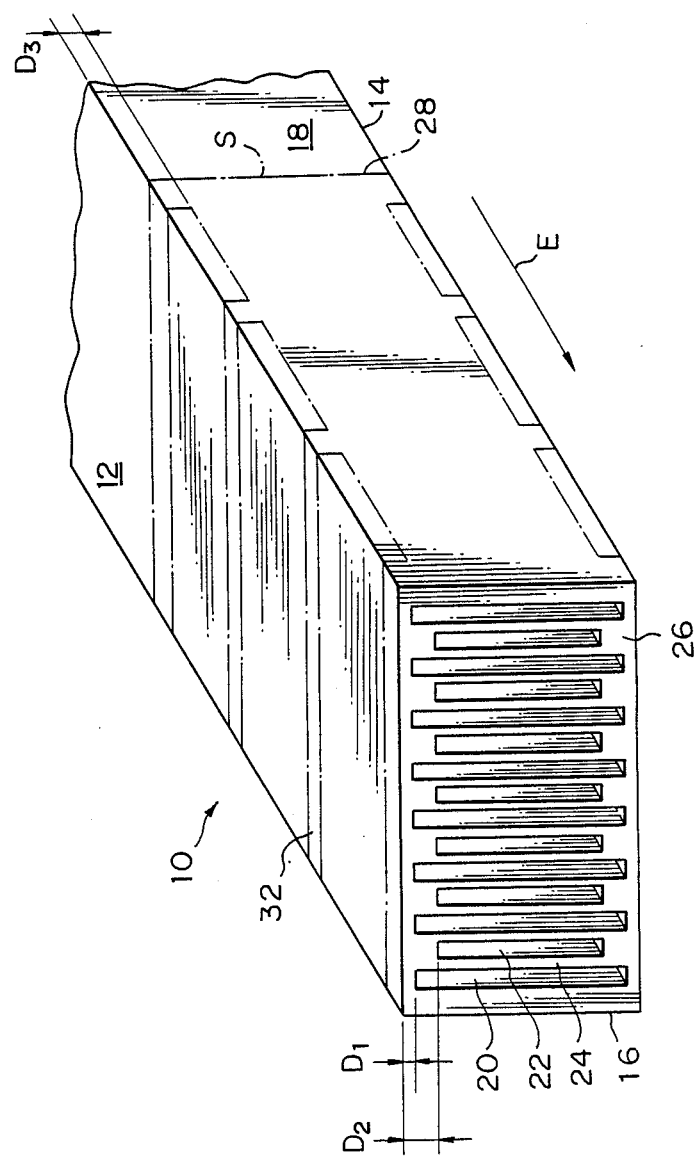
FIGS. 1 and 2 are perspective views illustrating the method according to the first embodiment of the invention, with FIG. 1 showing the extruded continuous molding formed by the extrusion step and FIG. 2 showing a block type heat exchange element in the finished state.
Figure 2:
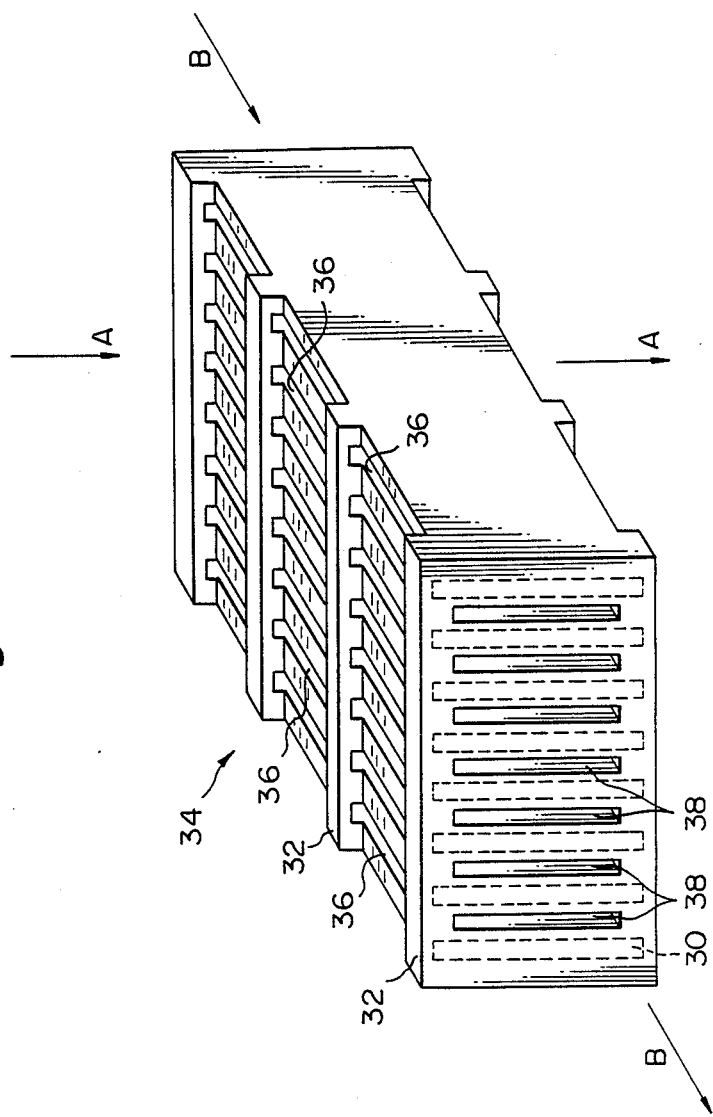

FIGS. 1 and 2 illustrate the method according to the first embodiment of the invention. A molding material or "green" described later is intimately kneaded in a usual screw extruder and is extruded through the extrusion die thereof in the direction shown by the arrow E in FIG. 1 to form a continuous extrusion molding 10. The continuous molding 10 is defined by continuous upper and lower surfaces 12 and 14 and continuous side surfaces 16 and 18 and has a slotted rectangular cross-section as shown in FIG. 1. The extrusion die of the extruder is provided with an extrusion orifice having a shape complementary to the cross-sectional configuration of the molding. In the illustrated embodiment, the continuous molding 10 is provided with a plurality of equally spaced discrete first passages 20 each extending through the molding 10 in the direction of extrusion E as well as a plurality of equally spaced discrete second passages 22 similarly extending through the molding 10 in the extrusion direction E and each disposed alternately between adjacent consecutive first passages 20. As will be understood from FIG. 1, the transversal cross-sectional configuration of the first passages 20 is elongated and extends in the up and down direction to terminate at a predetermined depth $D_1$ from the upper and lower surfaces 12 and 14. The respective second passages 22 similarly have an elongated rectangular transversal cross-sectional configuration which extends in the up and down direction and which terminates at a predetermined depth $D_2$ greater than the first depth $D_1$. Adjacent first and second passages 20 and 22 are separated from each other by a thin partition wall 24.

After setting, the continuous molding 10 is cut at a predetermined length along the cutting plane S (FIG. 1) to obtain a parallelepiped molding section. Alternatively, cutting may be performed prior to setting. In the thus-cut molding section, the first and second passages 20 and 22 will be opened into the front and rear end surfaces 26 and 28 formed by the cutting.

Then, among the openings of the first and second passage 20 and 22 appearing on the end surface 26 and 28, only the openings of the first passages 20 are closed by a suitable filling or closure material 30. Alternatively, the closing operation may be carried out after the cutting-out operation described below.

Finally, except for a plurality of reinforcement portions 32, the upper and lower surfaces 12 and 14 are machined to remove the material by a predetermined third depth $D_3$, to obtain a finished product 34 of the block type heat exchange element as shown in FIG. 2. The depth $D_3$ of the machining must satisfy the relationship $D_1 < D_3 < D_2$.

The discrete parallel first passages 20 closed in the closing step will be opened into the upper and lower surfaces of the completed element 34 through the removal of the material in the cutting-out step to form first fluid channels 36 of the heat exchange element 34, while the discrete parallel second passages 22 extending through the element 34 along the extrusion direction E and opening into the front and rear surfaces 26 and 28 form the second fluid channels 38 of the heat exchange element 34.

In use, a pair of headers for a first heat exchange medium are connected to the upper and lower surfaces of the heat exchange element 34 to force the first heat exchange medium to flow through the first fluid channels 36 in the direction of the arrow A as shown in FIG. 2. Also, a pair of headers for a second heat exchange medium are connected to the front and rear surfaces 26 and 28 of the element 34 to allow the second heat exchange medium to flow through the second fluid channels 38 in the direction of the arrow B parallel to the extrusion direction E. These two heat exchange media will flow in the crossing directions to transfer heat through the partition walls 24. Thus, the flow pattern will be a cross-flow type in this heat exchange element 34.

To increase the heat conductivity across the partition walls 24 and improve the heat exchange efficiency of the element 34, it is desirable that the wall thickness of the partitions 24 be as small as possible, preferably in the range of from 0.06 to 1 mm. Similarly, to create as large a number of fluid channels as possible per unit volume of the heat exchange element 34, thereby to enlarge the heat transfer surface area per unit volume, it is desirable to reduce the width of the first and second passages to be as small as possible, preferably in the range of from 0.6 to 5 mm.

As described, the first and second passages 20 and 22 are elongated along the vertical direction in the transverse cross-section of the extrusion molding 10. It will be noted, however, that if the cross-sectional configuration of these passages is excessively elongated, the partition walls 24 will be no longer self-sustaining during the extrusion molding step and subsequent setting step, and thus the walls 24 will corrugate in the vertical direction thereby clogging the first passages 20 against the vertical direction flow and deteriorating the mechanical strength of the walls 24 in the finished heat exchange element 34. To overcome these shortcomings, in the transversal cross-sectional configuration of the first and second passages 20 and 22, the ratio of the width with respect to the length (or height) thereof may be selected from 1 to 15, preferably less than 8.

FIGS. 3 through 6 illustrate the method according to the second embodiment of the invention. This embodiment attempts to reduce or prevent the formation of corrugations in the partition walls 24, to reinforce the partition wall strength, and to enlarge the heat transfer surface area. Only the differences between the first and second embodiments will be described hereinafter. In the extrusion molding step, each two consecutive partition walls 24 adjacent to each second passage 22 are provided with a plurality of concurrently formed integral separating walls 40 spaced an equal distance apart and extending horizontally in parallel to the upper and lower surfaces 12 and 14. Each second passage 22 is divided by these separating walls 40 into a plurality of sub-passages 42. The presence of the separating walls 40 ensures that the partition walls 24 are more self-sustaining, serves to prevent the formation of corrugations of the partition walls 24 during the course of extrusion and setting, and increases the mechanical strength of the partitions 24 in the finished element 34. These separating walls 40 also serve to enlarge the heat transfer surface area of the second passages 22, thereby increasing the heat exchange efficiency of the element 34. The distance between adjacent separating walls 40, that is, the height of the sub-passages 42, may be desirably from 0.6 to 5 mm and the thickness of the separating walls 40 may be preferably from 0.06 to 1 mm. Other steps of the method according to the second embodiment are similar to those of the first embodiment and, therefore, need not be described again.

Figure 6:
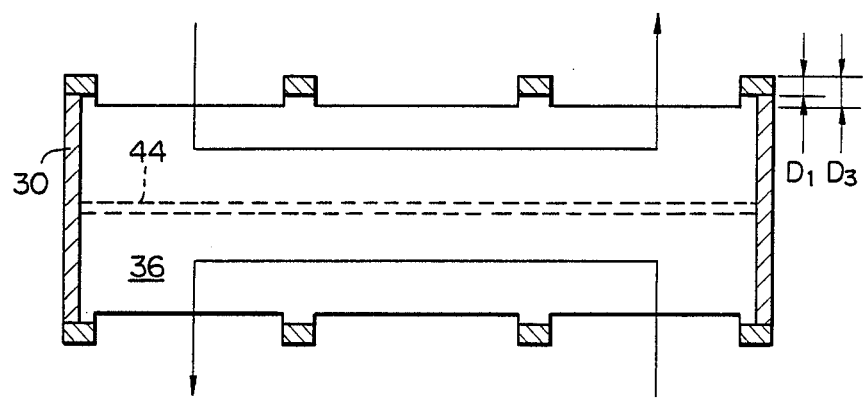
FIG. 6 is a cross-sectional view taken along the line VI—VI of FIG. 4.

FIG. 6 shows a modified method in which each first passage 20 is divided into two parts by horizontal central walls 44 in such a manner that the first fluid channels 36 are further divided into upper and lower channels. In this instance, the central regions of the upper and lower surfaces of the molding section are not cut out; to ensure that the two different heat exchange mediums are passed, respectively, through the upper and lower first fluid channels as shown by the arrows in FIG. 6. Thus, a heat exchange element is obtained which is capable of exchanging heat between three heat exchange fluids.

Figure 7:
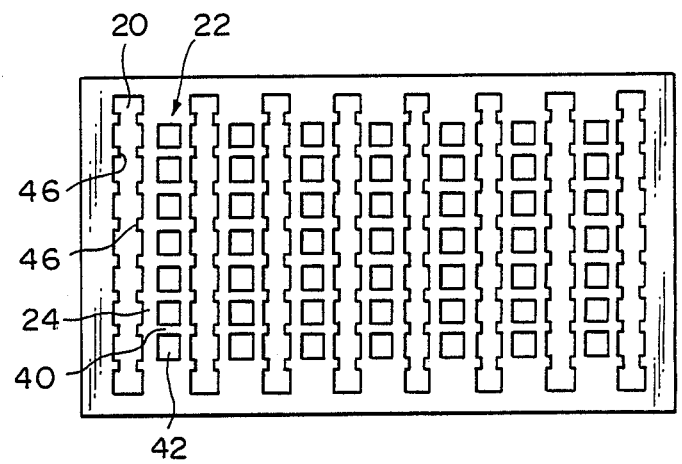
FIGS. 7 through 9 illustrate various transversal cross-sectional configurations of the extruded molding.

FIG. 7 illustrates another form of the cross-sectional configuration of the continuous molding formed in the extrusion molding step. The side walls of the respective first passages 20 are provided with a plurality of ribs 46 extending in the direction of extrusion and protruding toward the opposite side walls. These ribs 46 are positioned at the same levels as and in a symmetrical relationship with the separating walls 40. Thus, both side surfaces of each partition wall 24 are reinforced by the ribs 46 in addition to the separating walls 40; improving the self-sustaining capability of the partition walls 24 during the molding and subsequent steps and increasing the mechanical strength of the product. The ribs 46 also act to enlarge the heat transfer surface area of the first fluid channels 36. It should be noted, however, that the amount of protrusion of the ribs 46 must be so determined that it does not excessively increase the flow resistance of the first fluid channesl 36, because the first heat exchange medium flows through the first fluid channels 36 in the vertical direction.

Figure 8:
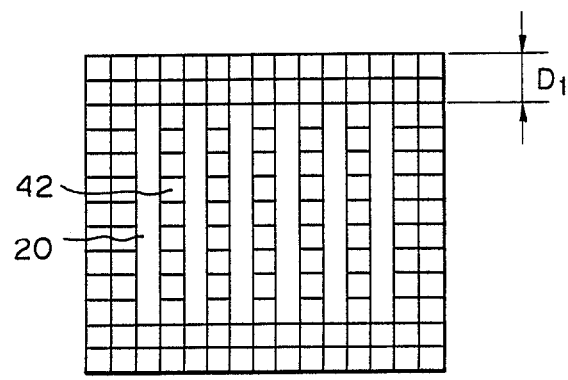

FIG. 8 shows another form of the cross-sectional configuration of the extruded continuous molding. In this embodiment, the modling includes an extremely thin-walled configuration in the form of a square grating, except for the regions forming the first passages 20. The cross-bars of the grating defining the upper and lower boundaries of the first passages 20 are located at the depth $D_1$ from the upper and lower surfaces of the molding.

Figure 9:
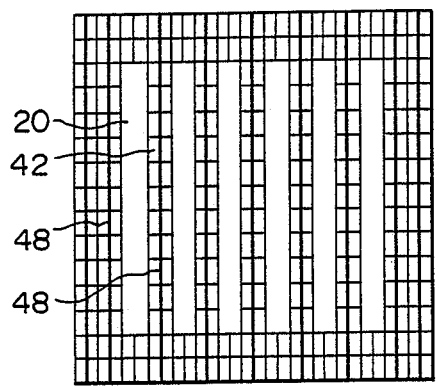

FIG. 9 illustrates a modification of the configuration shown in FIG. 8. As shown, vertically extending reinforcement walls 48 are provided in the regions other than those forming the first passages 20.

Figure 10:
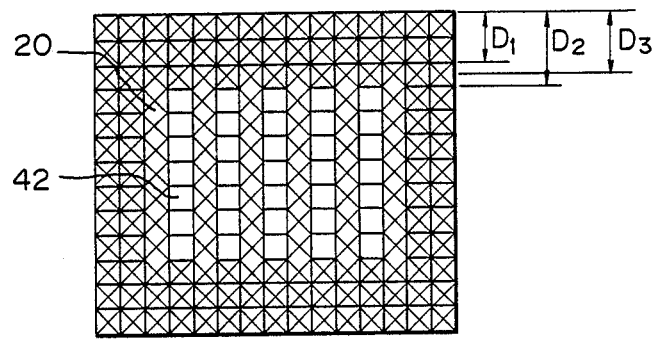
FIG. 10 shows by hatched lines the manner of closing an end of the molding section shown in FIG. 8.

The continuous molding having the cross-sectional configuration as shown in FIGS. 8 or 9 is cut to a predetermined length and allowed to set, followed by closing the front and rear surfaces of the molding section with a filling or closure material as shown by the hatched lines in FIG. 10. That is, the front and rear surfaces are closed except for those regions of the grating forming the second sub-passages 42 and extending up to the depth $D_2$ from the upper and lower surfaces of the molding section. Then, with the relationship similar to that described with respect to the preceding embodiment, the upper and lower surfaces of the molding section are cut out by the depth $D_3$ to open the first passages 20 into the upper and lower surfaces. Thus a block type heat exchange element is formed having a function similar to that of the element 34 shown in FIG. 4.

Figure 11:
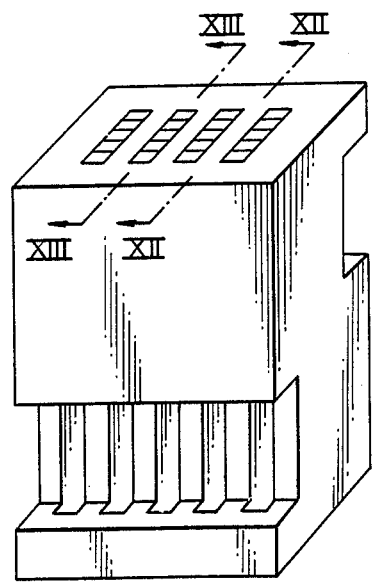
FIG. 11 is a perspective view showing a finished heat exchange element made from the molding section shown in FIGS. 8 and 10.
Figure 12:
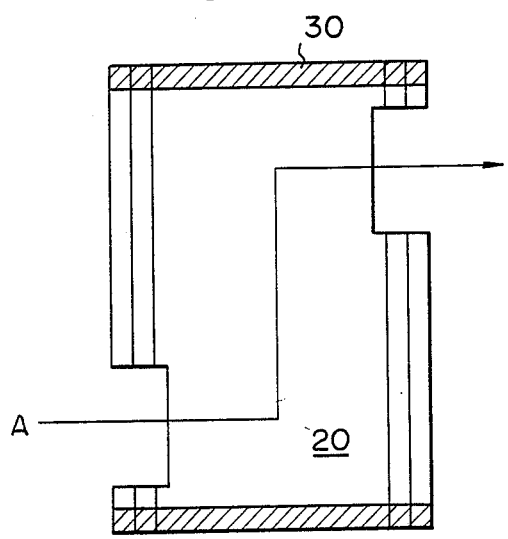
FIG. 12 is a cross-sectional view taken along the line XII—XII of FIG. 11.
Figure 13:
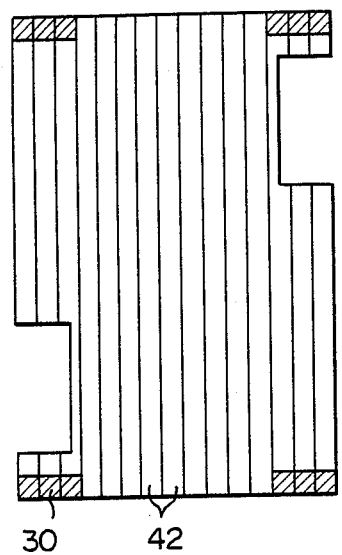
FIG. 13 is a cross-sectional view taken along the line XIII—XIII of FIG. 11.

FIGS. 11 through 13 illustrate an example of the block type heat exchange element obtained by the step shown in FIG. 10. As shown, the first fluid channels open into the surfaces of the element at the diagonally opposite regions. Thus, the first heat exchange medium flow through the first fluid channels is staggered, as shown by the arrow A in FIG. 12, in such a manner that the flow of the first heat exchange medium at the inlet and the outlet of the second fluid channels becomes a cross-flow relative to the second heat exchange medium while at the central region the flow is a counter-current or parallel flow.

Figure 14:
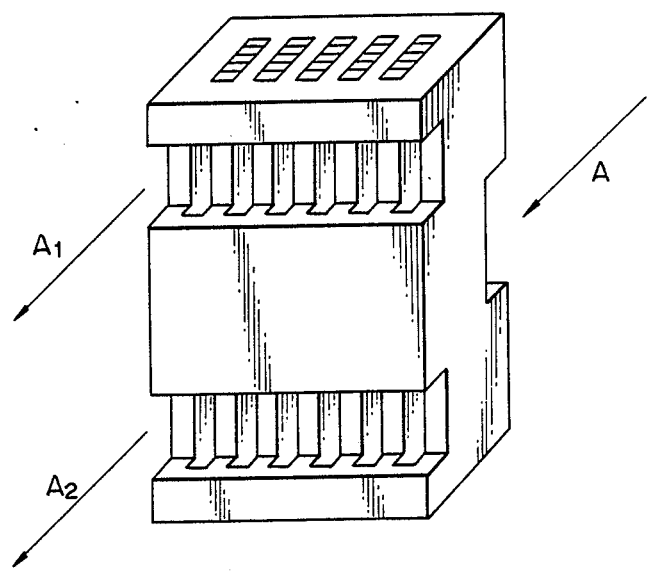
FIG. 14 is a perspective view showing another version of the finished element shown in FIG. 11.

FIG. 14 shows a modified form of the element shown in FIG. 11. In one surface, the first passages are open at the central region, and, in the opposite surface, the first passages are open at spaced two regions so that the flow of the first heat exchange medium flowing into the element along the arrow A is divided into two flows $A_1$ and $A_2$.

Figure 15:
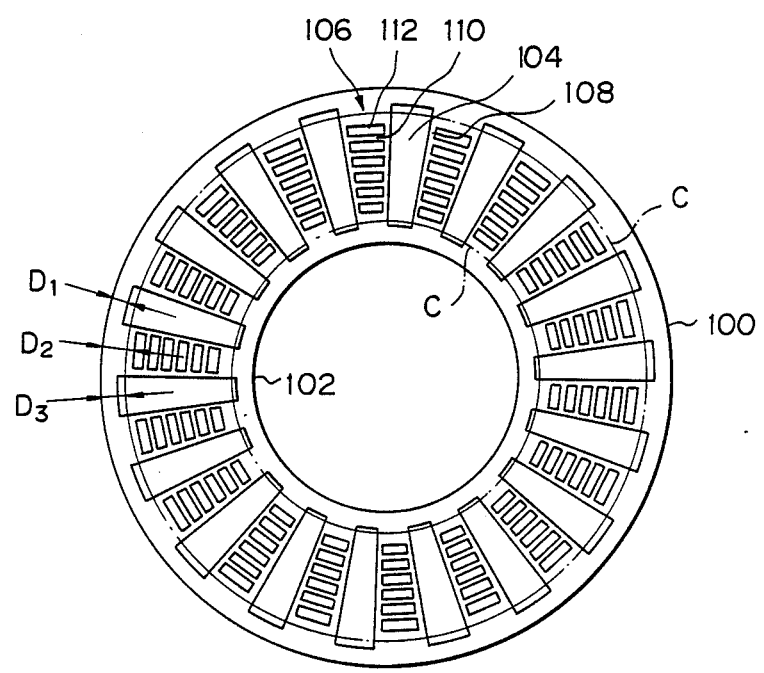
FIG. 15 illustrates a transversal cross-section of the extruded molding for use in manufacturing a heat exchange element in the form a hollow cylinder.
Figure 16:
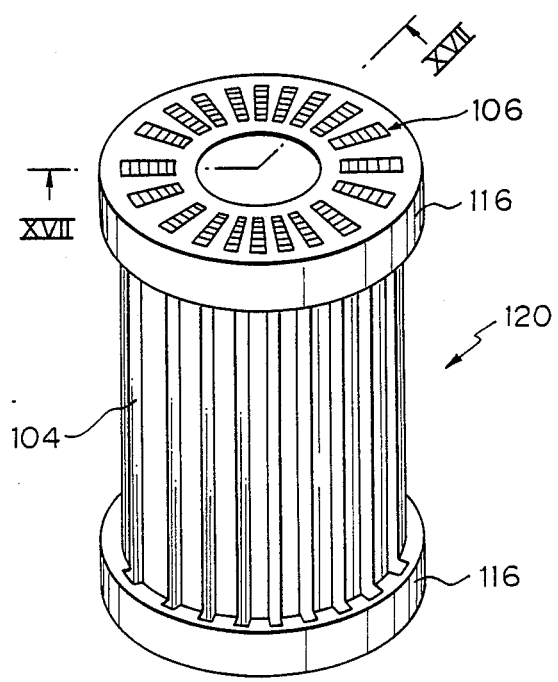
FIG. 16 is a perspective view of the hollow-cylindrical heat exchange element.
Figure 17:
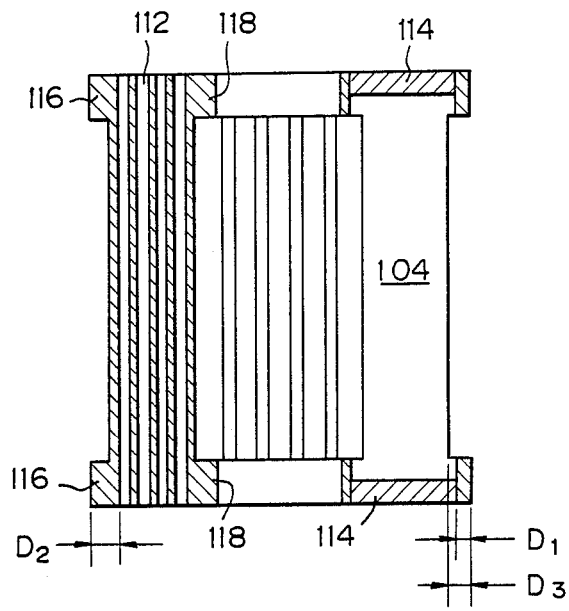
FIG. 17 is a cross-sectional view taken along the line XVII—XVII of FIG. 16.

FIGS. 15 through 17 illustrate another embodiment of the invention by which it is intended to manufacture a block type heat exchange element in the form of a hollow cylinder. The molding material is extruded through the extrusion die of the extruder with a transverse cross-sectional configuration as shown in FIG. 15. The extruded continuous molding is defined by a cylindrical outer surface 100 and a cylindrical inner surface 102, with the first and second passages 104 and 106 both having a cross-sectional configuration elongated in the radial direction. The first and second passages 104 and 106 are separated from each other by radially extending partition walls 108, and each second passage 106 is divided by substantially circumferentially extending separating walls 110 into a plurality of sub-passages 112. The respective first passages 104 terminate at the distance $D_1$ from the outer and inner surfaces 100 and 102, and the second passages 106 terminate at the distance $D_2$. The continuous extruded molding is allowed to set and is transversally cut into a predetermined length to obtain molding sections. The openings of the first passages 104 obtained by the cutting on the end surfaces of the molding section are closed by the filling material 114 as shown in FIGS. 16 and 17. Then, the molding section is machined, except for the marginal reinforcement portions 116 and 118, to cut out and remove the material along the cylindrical machining planes C (FIG. 15) located at the depth $D_3$ ($D_1 < D_3 < D_2$) from the outer and inner surfaces 100 and 102. This results in a hollow-cylindrical block-type heat exchange element 120 in which the respective first passages 104 are open into and communicated with the outer and inner surfaces 100 and 102 (see FIGS. 16 and 17) to serve as the first fluid channels. In this element 120, the first heat exchange medium is directed to flow radially inwardly from the outer surface 100 to be collected in the central cavity, or vice versa. The second heat exchange medium is fed axially through the second fluid channels composed of the second passages 106. Thus, the flow pattern in this element 120 is cross-flow.

Figure 18:
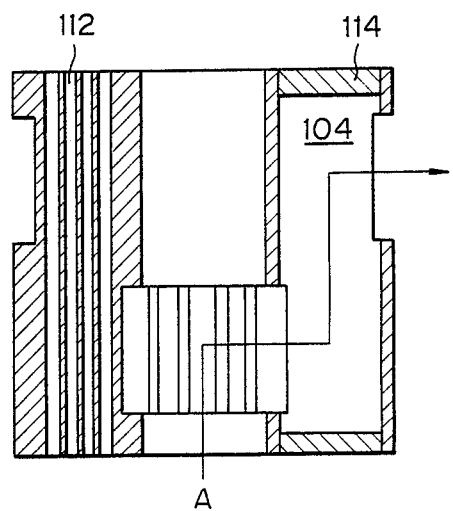
FIG. 18 is a view similar to FIG. 17 but showing a modified hollow-cylindrical heat exchange element having a different flow pattern.

FIG. 18 is a view similar to FIG. 17 but showing a modified heat exchange element. In this element, the outer and inner surfaces of the molding section are cut out at staggered regions to obtain a combined flow-pattern of cross-flow and countercurrent-flow as shown by the arrow A.

Figure 19:
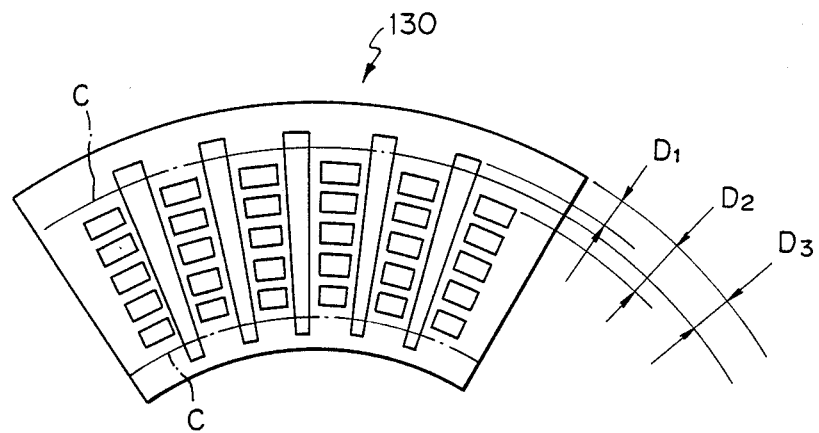
FIGS. 19 and 20 illustrate cross-sections of extruded moldings for use in forming heat exchange elements in the form of a segment of a hollow cylinder.

FIG. 19 illustrates a transverse cross-sectional configuration of the continuous extruded molding 130 used to fabricate a heat exchange element in the form of a segment of a hollow-cylinder. The cross-sectional configuration differs from that shown in FIG. 15 only in that the sides thereof are defined by two radii passing the center of the hollow-cylinder. As shown, the first and second passages also extend in the radial directon and the second passages are each divided into plural sub-passages. The molding section is cut out similarly along the cylindrical cutting planes C at the depth $D_3$ ($D_1 < D_3 < D_2$). Other method steps are the same as those of the preceding embodiment. In use, a plurality of heat exchange elements may be arranged in a side-by-side relationship along a circle to form a hollow-cylindrical element such as shown in FIG. 16. The cross-sectional configuration shown in FIG. 19 enables the manufacture of heat exchange elements for use in a large size heat exchanger.

Figure 20:
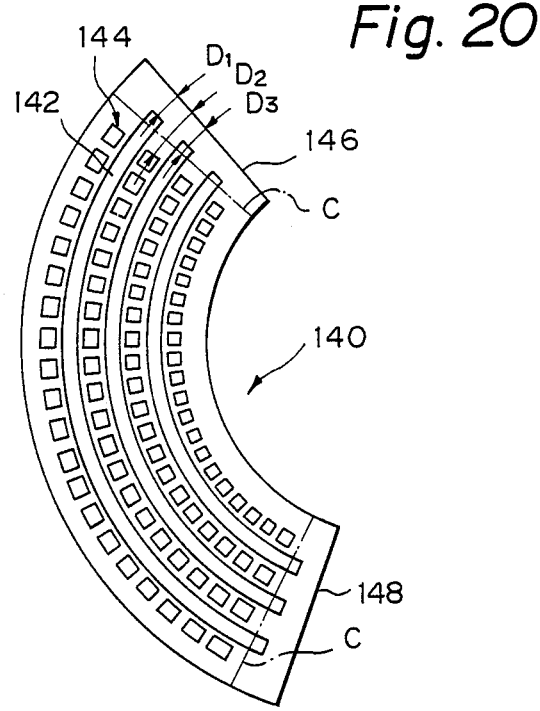

FIG. 20 illustrates another transverse cross-sectional configuration of the continuous molding 140 obtained in the extrusion molding step and usable to make a heat exchange element in the form of a segment of a hollow-cylinder. The cross-sectional configuration of the molding differs from that shown in FIG. 19 in that the first and second passages 142 and 144 extend in the circumferential direction. The first and second passages 142 and 144 terminate, respectively, at depths $D_1$ and $D_2$ from the sides of the sector. Cutting out of the material is performed along the planes C at the depth $D_3$ ($D_1 < D_3 < D_2$) to open the first passages 142 into the radially extending side surfaces 146 and 148. The heat exchange element thus produced may be used alone or in combination with other similar elements arranged side-by-side. The first heat exchange medium is circulated through the first fluid channels between the side surfaces 146 and 148.

Figure 21:
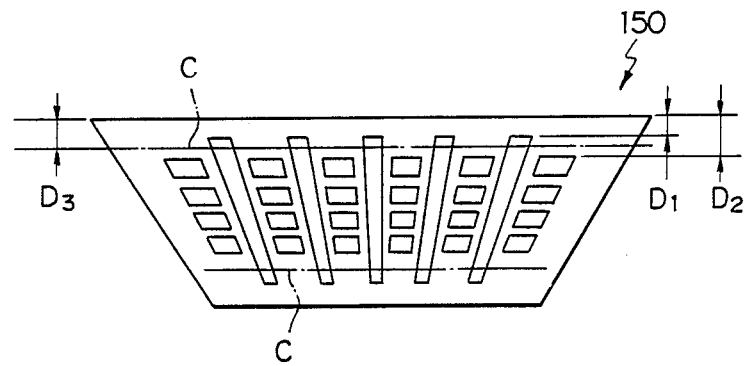
FIGS. 21 and 22 are cross-sectional views showing extruded moldings having an equilateral trapezoidal cross-section.
Figure 22:
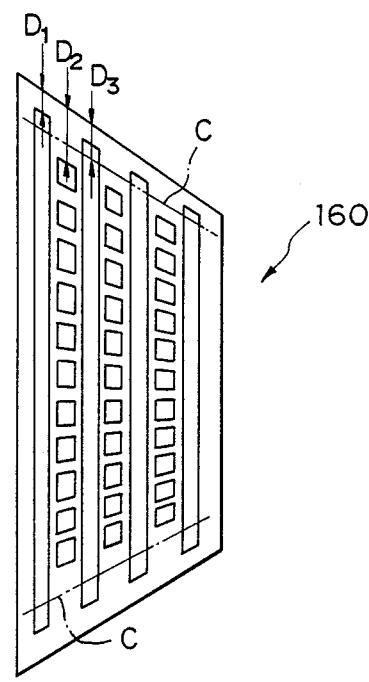

FIGS. 21 and 22 illustrate, respectively, variations of the transverse cross-sectional configurations of the continuous molding shown in FIGS. 19 and 20. The cross-sectional configurations of the respective moldings 150 and 160 are shown as shaped in the form of an equilateral trapezoid.

Molding Material

The molding materials used in the extrusion molding step may be any such material which is extrudable and is sufficiently self-sustaining to maintain the shape and configuration of the molding during the extrusion step and the subsequent various steps, and which exhibits an adequate mechanical strength during the use of the elements. Such material includes ceramic-forming green, plasticized thermoplastic resins, molten metals, molten glass, pulp slurry, and the like.

When a ceramic forming green is used as the extrusion molding material, the extruded continuous molding must be subjected to drying followed by sintering. In this instance, the step of cutting the molding into length and the step of machining the molding section to remove the material may be carried out either prior to or subsequent to the sintering step. However, the cutting and machining steps are preferably performed prior to the sintering step because, after sintering into ceramics, the material becomes hard, thereby rendering machining extremely difficult. When thus made from ceramics, the heat exchange element is highly heat-resistive and is suitable for circulating a heat exchange medium of a very high temperature. According to the invention, ceramic heat exchange elements having enlarged heat transfer surfaces may be produced simply and at reduced costs by resorting to the extrusion molding described hereinabove.

A ceramic-forming composition having an ingredient equivalent to that of cordierite ($2MgO.2Al_2O_3.5SiO_2$) may be used as a ceramic-forming green. With this composition, the ceramic material formed by sintering becomes porous so that the resulting heat exchange element can be used as a total-heat exchange element; in the sense that it is capable of transferring between the first and second fluid channels not only the sensible heat but also the latent heat in the form of moisture. To ensure a more effective transfer of moisture, a hygroscopic material such as lithium chloride may be impregnated after sintering in the body of the heat exchange element made of porous ceramics.

To obtain heat exchange elements capable of functioning as liquid evaporator elements of a humidifier or a device for evaporating drainage of a refrigerator, a cordierite-forming molding composition is extruded and sintered to form a porous ceramic element, the subpassages of second fluid channels of which are thereafter filled with powders of plastics or ceramics or with unwoven fabric to form capillary conduits. In use, a liquid fed into the second fluid channels will move therethrough by capillary action and, on so doing, will migrate through the porous partition walls onto the inner surface of the first fluid channels where it will evaporate into the air flowing through the second fluid channels.

Where a heat exchanger is used to heat a passenger compartment of a vehicle provided with an internal combustion engine by recovering the heat of engine exhaust, it is desirable to strictly separate the two heat exchange media from each other, that is, to isolate the exhaust gas from the room air. In such instance, a porous heat exchange element may be first produced from a cordierite-forming molding composition and then subjected to metal plating or a coating of glass frit to form air-impermeable surface layers on the inner walls of the fluid channels. Alternately, a green having a cordierite-forming composition may be first sintered to form a porous ceramic which is then subjected to communition to form ceramic powders which are blended in a small amount with the cordierite-forming green to form, when sintered, a dense, non-airpervious ceramic substantially having a composition of cordierite.

For manufacturing heat exchange elements suitable for use in heat exchangers for recovering exhaust heat from gas turbine engines, a green having a composition of $\beta$-spodumene ($LiO_2.Al_2O_3.6SiO_4$), silicon nitride, silicon carbide, or the like may be used to form block type heat exchange elements which are heat-resistive and have an improved property against thermal shock. A green having the composition of $\beta$-spodumene may be obtained from a basic mixture of lithium feldspar and kaoline with a small amount of lithium carbonate added as required.

Other extrudable molding materials usable in the method according to the invention include thermoplastic resins. When the heat exchange elements are to be used in a heat exchanger for cooling a coolant, as in the case of an automotive radiator, the thermoplastic resin may be blended with powders of thermoconductive materials such as metals to increase the thermal conductivity. Additionally, the thermoplastic materials may be reinforced by filling fibers therein.

EXAMPLE 1

Talc, alumina, and kaoline were appropriately blended to form a ceramic-forming material having the composition of cordierite ($2MgO.2Al_2O_3.5SiO_2$). 100 parts by weight of such ceramic forming material was mixed with 6 parts by weight of methylcellulose and 33 parts by weight of water and the entire mixture was kneaded to form a molding green. The green was then extruded by a conventional screw extruder to obtain continuous extrusion moldings. Various dies having different die slot configurations were used to extrude moldings having various cross-sectional configurations roughly similar to that shown in FIG. 1 but with varying ratios k of the length of the larger side of the rectangle of the transverse cross-section of the first and second passages 20 and 22 with respect to the length of the shorter side thereof. When the ratio k (length of larger side/length of shorter side) becomes equal to or exceeds 8, the formation of corrugations was observed on the partition walls 24 during the course of extrusion and the spacings between the partition walls 24 became non-uniform. As the ratio K was further increased to about 15, intensive corrugations were formed on the partition walls 24 so that the walls 24 were brought into contact with each other at a number of locations, whereby the first passages 20 were clogged in the direction perpendicular to the direction of extrusion, making it impossible to form usable first fluid channels.

Also, with the ratio k larger than 15, the spacing between the reinforcement separating walls 40 becomes excessively large, and thus the mechanical strength of the partition walls 24 becomes so low that they are broken by even a light impact. Thus, the resulting heat exchange elemnets would not be serviceable for practical application.

EXAMPLE 2

Figure 3:
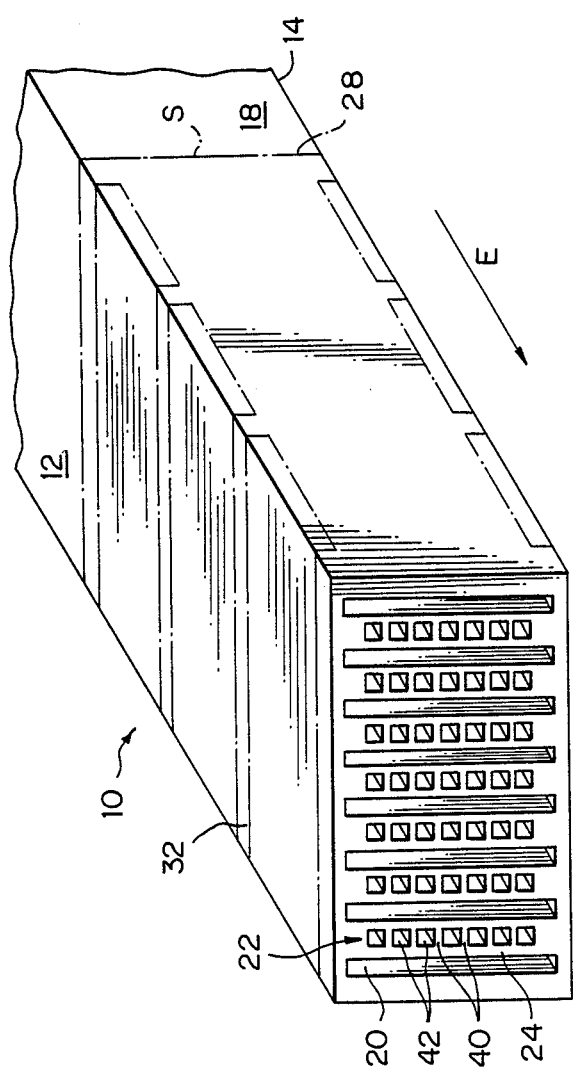
FIGS. 3 and 4 are views similar to FIGS. 1 and 2, respectively, but illustrating the method according to the second embodiment.

The same molding green as in the first example was used to extrude a continuous molding having a cross-section as shown in FIG. 3. The continuous molding was then cut into a predetermined length to obtain a molding section and was subjected to drying. Next, among the openings opened into the front and rear end surfaces of the molding section extending perpendicular to the direction of extrusion, those openings of the first passages 20 not provided with reinforcement separating walls 40 were filled and closed to a suitable depth with a filling material in the form of a paste made from the afore-mentioned molding green having an added water content. The resulting molding section was dried again and machined by a milling or grinding machine to mechanically remove the material of the upper and lower walls over the depth $D_3$, except for the reinforcement portions 32, until the passages 20 opened into the upper and lower surfaces of the molding section. The machined molding section was sintered for 5 hours in an electric furnace at 1,420° C. to form a monolithic block type heat exchange element as shown in FIG. 4.

The ceramic material forming the thus obtained heat exchange element and having a composition equivalent to cordierite was a porous ceramic body having a porosity in the order of 20%. The element was then impregnated with an aqueous solution of lithium chloride and mounted within a heat exchanger for the exchange of total heat between two fluids circulated, respectively, through the first and second fluid channels. As the heat exchange element had small airpermeability but excellent heat and moisture transfer ability, it was possible to transfer both the sensible and latent heats with a good heat exchange efficiency but without mixing the two fluids.

EXAMPLE 3

Figure 4:
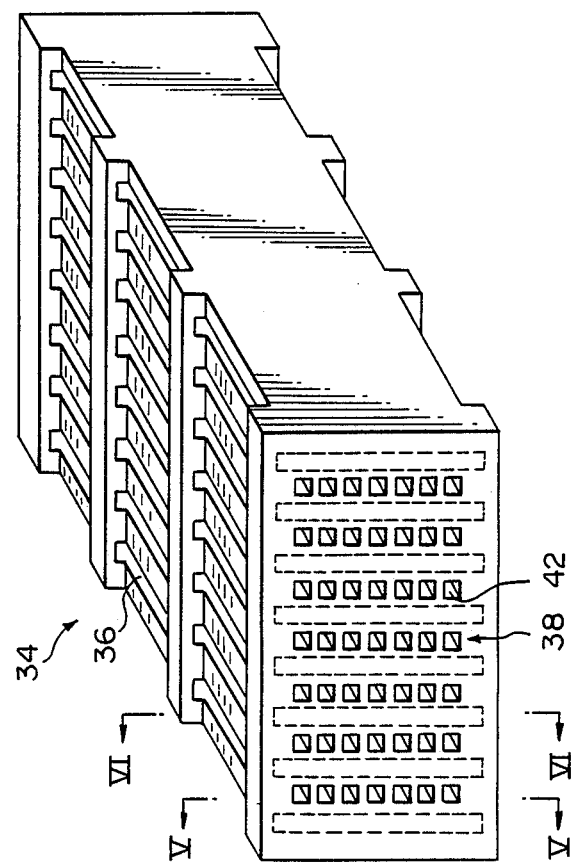
Figure 5:
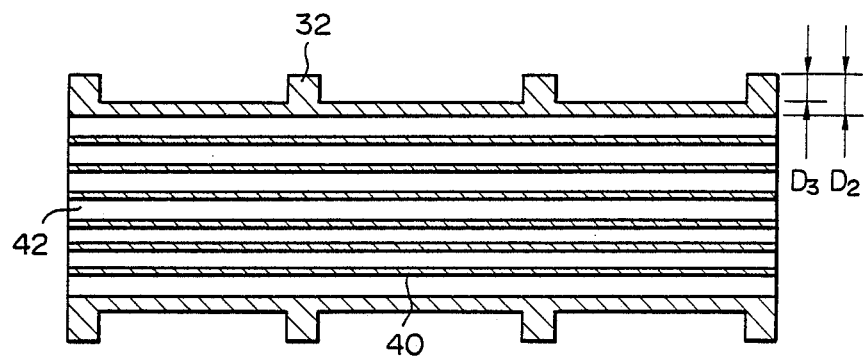
FIG. 5 is a cross-sectional view taken along the line V—V of FIG. 4.

The heat exchange element shown in FIG. 4 and obtained in Example 2 was used and the sub-passages 42 thereof were filled with powders of plastics to form capillary tubes extending throughout and along the sub-passages. The resulting heat exchange element was placed in such a manner that an ends of the sub-passages opening into the front end surface of the element were submerged in water, and air was then passed through the first fluid channels 36. It was observed that the water migrated by capillary action through the sub-passages 42 and penetrated by the similar action through the porous partition walls 24 onto the inner walls of the first fluid channels, where it quickly evaporated into the flowing air. This indicates that the heat exchange element of this Example is suitable for use in a liquid evaporator device such as a humidifier, a device for evaporating drainage of a refrigerator, and the like.

Other capillary-forming materials such as particles of glass and powders or grains of ceramics were tested as materials to be filled within the sub-passages 42, and proved to achieve similar results. It should be noted that the heat exchange element as used as a liquid evaporator element may be used to evaporate any liquid other than water, such as organic solvent, as long as the liquid is flowable through the sub-passages 42 by capillary action.

EXAMPLE 4

Talc, alumina, and kaoline were suitably blended to form a ceramic forming material having the composition of cordierite as in the first Example. A part of this ceramic forming material was sintered to form a porous synthetic cordierite-like ceramic which was then milled into powders. Then, 100 parts by weight of the ceramic forming material were mixed with 2 parts by weight of the synthetic cordierite powders, 6 parts by weight of methylcellulose, and 35 parts by weight of water, and the resultant mixture was intimately kneaded to form a molding green suitable for extrusion. The green was then extruded and subjected to the subsequent processings in the same manner as in the second Example, to obtain a heat exchange element shown in FIG. 4. The ceramic material forming the heat exchange element was a dense, cordierite-like ceramic having a porosity of less than 2%, so that in the partition walls 24 no capillary passage was formed across the partition walls between the first and second passages 20 and 22. Thus, the first and second fluid channels were perfectly isolated from each other.

Thus, it was possible to advantageously use the resulting heat exchange element in a heat exchanger of a car heater system to heat the air in the vehicle passenger compartment by the heat of exhaust gas from a diesel engine.

EXAMPLE 5

A molding composition of polypropylene containing 40% by weight of aluminum powders was heated to a molding temperature and extrusion molded to obtain a continuous molding of a monolithic structure having a transversal cross-sectional configuration as shown in FIG. 8. The molding was then allowed to cool and cut into sections. Then, the front and rear end surfaces of the molding section were closed, only for the area shown by the hatched lines in FIG. 10, with a potting material containing essentially silicone rubber, to a suitable depth. Parts of the upper and lower walls of the molding section were then cut out through the depth $D_3$ (see FIG. 10) until the first passages 20 were opened into the upper and lower surfaces, but the separating walls 40 located at the depth $D_2$ were preserved. As a result, a heat exchange element as shown in FIG. 11 was obtained.

The thus produced heat exchange element was used as a heater core of a car heater system and proved to have an adequate heating capability.

While the present invention has been described herein with reference to the specific embodiments thereof, it should be understood that it is not limited

We claim:

1. A method of manufacturing a block-type heat exchange element including a block having mutually opposed first and second surfaces and mutually opposed third and fourth surfaces intersecting said first and second surfaces, said block having a series of discrete first fluid channels extending therethrough between said first and second surfaces and a series of discrete second fluid channels extending therethrough between said third and fourth surfaces independently from said first fluid channels, said method comprising the steps of:
   (a) preparing a molding material in an extrusion moldable state;
   (b) extruding said molding material to form a continuous molding having a predetermined transversal cross-sectional configuration and having mutually opposed, continuous first and second surfaces forming said first and second surfaces of the block and extending in parallel to the direction of extrusion, said continuous molding having a series of discrete first passages extending therethrough in parallel to the direction of extrusion and each having an elongated cross-sectional configuration extending toward said continuous first and second surfaces up to a predetermined first depth therefrom, said continuous molding further having a series of discrete second passages extending therethrough in parallel to the direction of extrusion and each having an elongated cross-sectional configuration extending toward said continuous first and second surfaces up to a predetermined second depth therefrom, said second depth being greater than said first depth, said second passages being arranged alternately with said first passages and separated from said first passages by partition walls extending toward said continuous first and second surfaces and extending in the direction of extrusion, said second passages forming said second fluid channels in said block;
   (c) setting said continuous molding;
   (d) cutting said continuous molding in the transverse direction at a predetermined length to form a molding section having end surfaces forming said third and fourth surfaces of the block, said first and second passages being opened by said cutting into said third and fourth surfaces;
   (e) closing openings of said first passages opened into said third and fourth surfaces by a closure material; and
   (f) cutting out at least parts of said molding section along said first and second surfaces at a predetermined third depth intermediate to said first and second depth until said first passages are opened into said first and second surfaces to form said first fluid channels.

2. A method according to claim 1, wherein said transversal cross-sectional configuration of said continuous molding in said extruding step (b) is of a parallelogram, said molding section after said cutting step (d) being in the form of a parallelpiped, with the upper and lower surfaces thereof forming said first and second surfaces of the block and with the front and rear surfaces thereof forming said third and fourth surfaces, said elongated cross-sectional configurations of said first and second passages extending perpendicularly to said upper and lower surfaces.

3. A method according to claim 1, wherein said transversal cross-sectional configuration of said continuous molding in said extruding step (b) is of an annular ring, said molding section after said cutting step (d) being in the form of a hollow cylinder, with the outer and inner cylindrical surfaces thereof forming said first and second surfaces of the block and with the front and rear surfaces thereof forming said third and fourth surfaces of the block, said elongated cross-sectional configurations of said first and second passages extending radially of said hollow cylinder.

4. A method according to claim 1, wherein said transversal cross-sectional configuration of said continuous molding in said extruding step (b) is of a segment of an annular ring defined by cutting the annular ring with two radii angularly spaced apart from each other, said molding section after said cutting step (d) being in the form of a segment of a hollow cylinder formed by cutting the hollow cylinder with two planes angularly spaced from each other and passing through the centerline of the hollow cylinder, the outer and inner cylindrical surfaces of said segment of hollow cylinder forming said first and second surfaces of the block and the front and rear surfaces thereof forming said third and fourth surfaces of the block, said elongated cross-sectional configurations of said first and second passages extending radially of said segment of hollow cylinder.

5. A method according to claim 1, wherein said transversal cross-sectional configuration of said continuous molding in said extruding step (b) is of a segment of an annular ring defined by cutting the annular ring with two radii angularly spaced apart from each other, said molding section after said cutting step (d) being in the form of a segment of a hollow cylinder formed by cutting the hollow cylinder with two planes angularly spaced apart from each other and passing through the centerline of the hollow cylinder, the outer and inner cylindrical surfaces of said segment of hollow cylinder forming said first and second surfaces of the block and the front and rear surfaces thereof forming said third and fourth surfaces of the block, said elongated cross-sectional configurations of said first and second passages extending circumferentially of said segment of hollow cylinder.

6. A method according to claim 1, wherein said transversal cross-sectional configuration of said continuous molding in said extruding step (b) is that of an equilateral trapezoid.

7. A method according to claim 1, wherein the ratio of the larger side with respect to the shorter side in the transversal cross-sectional configuration of said first and second passages in said extruding step (b) is in the range of from 1 to 15.

8. A method according to claim 7, wherein said ratio is in the range of from 1 to 8.

9. A method according to claim 1, wherein each of said second passages in said extruding step (b) is further divided into a plurality of discrete, mutually aligned sub-passages by a plurality of separating walls extending parallel to said first and second continuous surfaces.

10. A method according to claim 9, wherein, in said extruding step (b), the thickness of said partition walls is in the range of from 0.06 to 1 mm, the thickness of said separating walls being in the range of from 0.06 to 1 mm, and the distance between adjacent separating walls being in the range of from 0.6 to 5 mm.

11. A method according to claim 9, wherein, in said extruding step (b), the inner walls of said first passages are provided with a plurality of ribs extending in the direction of extrusion for reinforcement of said partition walls.

12. A method according to claim 11, wherein said ribs are arranged in a symmetrical relationship with said separating walls with respect to said partition walls.

13. A method according to claim 1, wherein said molding material comprises a ceramic-forming green, said setting step (c) comprises a step for drying said continuous extrusion molding, and wherein said method further comprises subsequent to said cutting step (c) a step for sintering said molding section.

14. A method according to claim 13, wherein said ceramic-forming green comprises a composition of cordierite.

15. A method according to claim 14, wherein, for manufacturing a block-type heat exchange element suitable for use as a total heat exchange element, said method further comprises after said sintering step, a step for impregnating a hygroscopic agent into said element.

16. A method according to claim 15, wherein said hygroscopic agent comprises lithium chloride.

17. A method according to claim 14, wherein, for manufacturing a block-type heat exchange element usable as an evaporator element, said method further comprises after said sintering step, a step for filling a capillary-forming material within said second passages.

18. A method according to claim 14, wherein said ceramic-forming green is blended with powders of ceramics having cordierite composition to form a dense ceramic block.

19. A method according to claim 14, wherein said method further comprising after said sintering step, a step for forming non-airpervious layers on said partition walls located between said first and second passages.

20. A method according to claim 1, wherein said molding material comprises thermoplastic resin.

21. A method according to claim 20, wherein said thermoplastic resin contains powders of thermally conductive material.

22. A method according to claim 20, wherein said thermoplastic resin contains fibers for reinforcement.

23. A method according to claim 1, wherein said molding material comprises a metal.

24. A method according to claim 1, wherein said molding material comprises glass.

25. A method according to claim 1, wherein said molding material comprises a pulp slurry.

26. A method according to claim 1, wherein, for manufacturing a block-type heat exchange element capable of exchanging heat between three heat exchange media, each of said first passages formed in said extruding step (b) is further divided into upper and lower passages by a central horizontal wall extending in the direction of extrusion parallel to said first and second continuous surfaces.

* * * * *